Aug. 22, 1939.   N. A. TORNBLOM   2,170,393
DEVICE FOR CONNECTING CABLE TO A BOX
Filed April 1, 1938
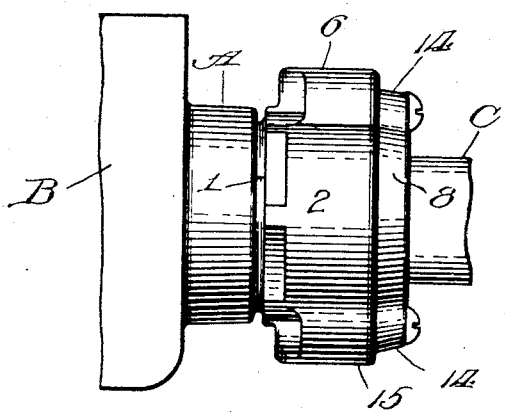
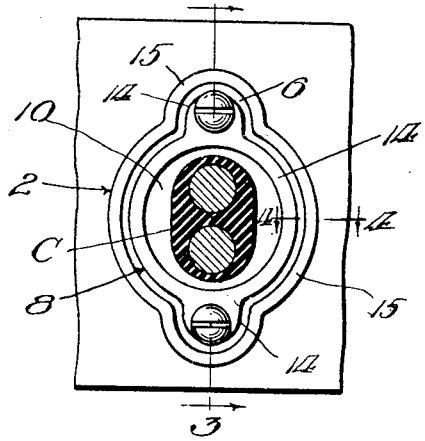
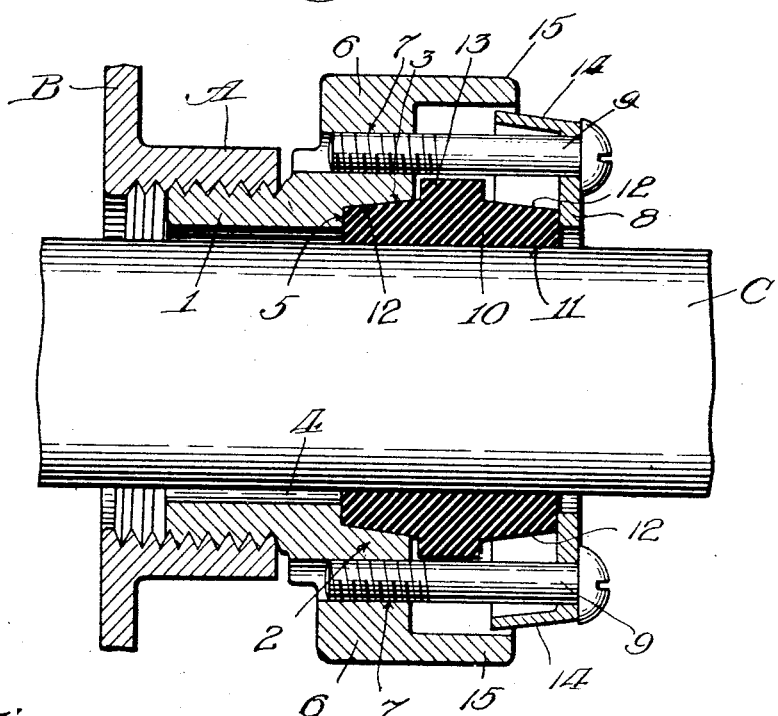
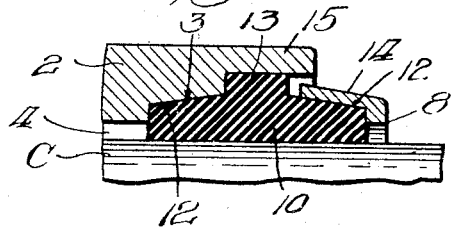
Inventor:
Nik A. Tornblom,
by Wm. F. Freudenreich,
Atty.

Patented Aug. 22, 1939

2,170,393

UNITED STATES PATENT OFFICE 2,170,393

DEVICE FOR CONNECTING CABLE TO A BOX

Nils A. Tornblom, Chicago, Ill., assignor to Appleton Electric Company, a corporation of Illinois Application April 1, 1938, Serial No. 199,346

2 Claims. (Cl. 285—164)

The present invention relates to means for securing in place a cable passing through an opening in a wall of a connection box, into the latter, or through any other wall, and sealing such opening to prevent leakage of fluids through the same along the cable; and has for its object to produce a simple and novel connector for this purpose.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side elevation of a fragment of a connection box having one of my devices attached thereto; Fig. 2 is an end view looking toward the left at the right-hand end of Fig. 1, the cable being shown in section; Fig. 3 is a central longitudinal section on line 3—3 of Fig. 2, but on a larger scale; and Fig. 4 is a section on line 4—4 of Fig. 2, on the same scale as Fig. 3.

Referring to the drawing, 1 represents a sleeve externally screw-threaded at one end for cooperation with an internally screw-threaded hub A on a wall B of a connection box, or other wall. The other end of the member 1 is enlarged and the bore therein is also enlarged, as indicated at 2, preferably in the form of a frusto-conical section 3 the smaller diameter of which is at the inner end, and which diameter is considerably larger than that of the main bore 4 in the sleeve. Thus, there occurs an abrupt step between the bore sections 3 and 4, which provides an annular face or shoulder 5 in a plane at right angles to the long axis of the sleeve. The enlargement or head 2 has radial projections 6 at diametrically opposed points. Each of these projections has a screw-threaded hole 7 extending through the same parallel with the axis of the sleeve. Cooperating with the sleeve is a flat pressure ring 8 provided with suitable openings through which extend headed screws 9 that enter the screw holes 7 in the sleeve. Arranged between what is the free end of the sleeve when the latter is screwed to a wall, and the pressure ring, is a thick gasket 10 of suitable yieldable packing material, preferably rubber. The gasket 10 is preferably in the form of a short thick-walled sleeve the bore 11 of which is of the same shape as the cross section of a cable C to be received, but is preferably slightly larger, normally, to permit the cable to be easily inserted in the same.

The external shape of the gasket is preferably that of two similar cone frustums 12, 12 having their large bases on the ends toward each other but separated from each other by a short projecting rib 13 whose periphery is cylindrical. The angles of the cones are the same as that of the frusto-conical bore 3 in the sleeve, so that either of the frusto-conical ends of the gasket may fit into this frusto-conical bore while the pressure ring 8 engages the end face of the gasket. Then, upon inserting the screws 9 and tightening them, the pressure ring forces the gasket against the annular shoulder 5 and causes such deformation of the gasket that the latter produces a seal at the shoulder 5, within the frusto-conical bore 12, and between the gasket and the cable.

The pressure ring has on the inner or rear side a flange 14 which takes a frusto-conical shape complementary to that of one of the frusto-conical ends 12 of the gasket. Therefore, as best shown in Fig. 4, when the pressure ring is drawn inward, the flange 14 contracts one end of the sleeve-like gasket, so that that end is pressed into intimate contact with the cable in the same way as is done to the other end by the cavity in the sleeve. It will also be seen that the enlarged end or head 2 of the sleeve member 1 is provided with a forwardly or outwardly projecting flange 15 which fits over the ridge portion 13 of the gasket and is adapted to overlap the flange 14 in all working positions of the latter, so that no part of the periphery of the gasket is exposed. The flange 15 follows the contour of the head or enlargement, including the projections 6 so that, in the zone of these projections, the flange does not come in contact with the gasket. The contour of the ring 8 is such that the flange 14 lies at about the same distance from the flange 15, at all points in a plane transverse to the axis of the fitting; so that, in the vicinity of the screws 9, it swerves away from the gasket and lies outwardly from the screws as does the flange 15 in these same regions. The head or enlargement on the sleeve 1 and the pressure ring may therefore be regarded as a pair of oppositely disposed cups engaged over the ends of the gasket and partially telescoped upon each other completely to enclose the gasket; the cups having radial extensions to provide space outwardly from the gasket for the reception of the clamping screws.

It will thus be seen that I have produced a simple and novel device composed of a few rugged parts, including a gasket of rubber or other soft material, by means of which a cable can successfully be fastened to a wall through which it passes, a fluid-tight seal for the opening in the wall be secured, and the gasket be effectively housed.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a sleeve adapted to be secured at one end to a support, the bore of the sleeve comprising cylindrical sections at the two ends, one of the cylindrical sections being much larger in diameter than the other, and an intermediate frusto conical section the smaller end of which is larger in diameter than the section of the bore of small diameter to form an abrupt shoulder between the same and the latter and the larger end of which is smaller than the end section of large diameter to form a second abrupt shoulder at the juncture with the latter, a cup-shaped member the chamber in which corresponds in size and shape to said frusto conical bore section, a sleeve-like rubber gasket fitting at its ends into said frusto conical bore section and said cup-shaped member, said gasket being of such axial length that said cup-shaped member is partially entered in the cylindrical bore section of larger diameter, and detachable fastenings securing said cup-shaped member and said sleeve together and adapted to draw the cup-shaped member into the bore of the sleeve.

2. In combination, a sleeve adapted to be secured at one end to a support, the bore of the sleeve comprising cylindrical sections at the two ends, one of the cylindrical sections being much larger in diameter than the other, and an intermediate frusto-conical section the smaller end of which is larger in diameter than the section of the bore of small diameter to form an abrupt shoulder between the same and the latter and the larger end of which is smaller than the end section of large diameter to form a second abrupt shoulder at the juncture with the latter, a cup-shaped member the chamber in which corresponds in size and shape to said frusto-conical bore section, a sleeve-like rubber gasket fitting at its ends into said frusto-conical bore section and into said cup-shaped member and having at the center an annular rib bearing against said second shoulder, and bolts connecting the cup-shaped member to the sleeve.

NILS A. TORNBLOM.